United States Patent
Daley

(10) Patent No.: US 10,017,949 B2
(45) Date of Patent: Jul. 10, 2018

(54) FLOORING TAPE

(71) Applicant: FloatMax Systems, Ontario (CA)

(72) Inventor: Shawn Bruce Joseph Daley, Ontario (CA)

(73) Assignee: FLOATMAX SYSTEMS, Concord, Ontario (CA)

( * ) Notice: Subject to any disclaimer, the term of this patent is extended or adjusted under 35 U.S.C. 154(b) by 132 days.

(21) Appl. No.: 14/916,701

(22) PCT Filed: Sep. 4, 2014

(86) PCT No.: PCT/CA2014/050840
§ 371 (c)(1),
(2) Date: Mar. 4, 2016

(87) PCT Pub. No.: WO2015/031995
PCT Pub. Date: Mar. 12, 2015

(65) Prior Publication Data
US 2016/0201339 A1    Jul. 14, 2016

Related U.S. Application Data

(60) Provisional application No. 61/873,669, filed on Sep. 4, 2013.

(51) Int. Cl.
*E04F 15/02* (2006.01)
*E04F 13/08* (2006.01)
*C09J 7/20* (2018.01)

(52) U.S. Cl.
CPC .......... *E04F 15/02155* (2013.01); *C09J 7/20* (2018.01); *E04F 13/0887* (2013.01); *C09J 2201/128* (2013.01); *C09J 2201/40* (2013.01); *C09J 2203/314* (2013.01); *C09J 2433/00* (2013.01)

(58) Field of Classification Search
CPC .......................................................... C09J 7/02
USPC .......................................................... 428/58
See application file for complete search history.

(56) References Cited

U.S. PATENT DOCUMENTS 5,087,494 A * 2/1992 Calhoun .................... C09J 7/00
                                                       428/148

FOREIGN PATENT DOCUMENTS

CA     2 468 450 A1    6/2003
KR    10-20011-0048219 A    5/2011

OTHER PUBLICATIONS

International Search Report and Written Opinion for International Patent Application No. PCT/CA2014/050840, dated Oct. 30, 2014, 8 pages.

* cited by examiner

*Primary Examiner* — Brent T O'Hern
(74) *Attorney, Agent, or Firm* — Westman, Champlin & Koehler, P.A.

(57) ABSTRACT

A flooring tape, for securing a first flooring unit adjacent to a second flooring unit is described. The flooring tape has two sides, a first adhesive side and a second non-adhesive side. The first adhesive side is made up of three portions, a first portion, a second portion and a third portion, the third portion positioned between the first and second portions. The first portion and the second portion have a flooring adhesive layer applied thereto for forming a bond with the first and second flooring units. The third portion has a water resistant adhesive layer applied thereto.

10 Claims, 7 Drawing Sheets

FLOORING TAPE

CROSS-REFERENCE TO RELATED APPLICATION

This Application is a Section 371 National Stage Application of International Application No. PCT/CA2014/050840, filed 4 Sep. 2014 and published as WO 2015/031995 A1 on 12 Mar. 2015, in English, the contents of which are hereby incorporated by reference in their entirety.

FIELD

A tape for use for securing a flooring material is disclosed, and in particular a tape for securing two or more flooring units adjacent to one another.

BACKGROUND

When applying a flooring material made up of several flooring units to a floor, each flooring unit is secured adjacent to another flooring unit until the entire floor is covered. To secure the flooring units, an adhesive material is applied to one side of each flooring unit and to the floor. However, removing a flooring unit at a later time, for example for repairs or for redecorating, becomes extremely difficult; as the flooring unit is stuck to the floor.

To resolve this issue, several flooring manufacturers have produced flooring units having a tongue and groove joint. Each flooring unit has a slot, i.e. the groove, cut all along one edge, and a thin, deep ridge, i.e. the tongue on the opposite edge. The tongue projects a little less than the depth of the groove. Two or more pieces thus fit together closely. However, removing a flooring unit at a later time will result in a different problem. The tongue of the joint will be lost; as it must be cut to facilitate removal of the flooring unit.

The use of tongue and groove joint is limited in application and generally cannot be used in with all types of flooring materials, such as, for example and without limitation, a vinyl flooring material. Consequently, vinyl or other similar flooring materials are held down by use of tapes at joints or edges of the flooring material to obtain a 'floating floor'. When vinyl or other similar flooring material is used and cleaned, the edges or joints can come loose due to the harsh chemical used in the cleaning reagents and sometime also due to water getting into the joints. This can result in warping of the flooring material, particularly around the edges, and which can be undesirable and also pose possible safety issues.

There is a need in the art for a material, such as an adhesive tape, that can be used for application of a flooring material, such as a vinyl flooring material, and that can help to address or mitigate some or all of the issues noted above. In addition, there is a need in the art for a method of application of an adhesive tape and a method of manufacture of the tape.

BRIEF DESCRIPTION OF THE DRAWINGS

Reference will now be made, by way of example, to the accompanying drawings which show example embodiments of the present application, and in which:

FIG. 5 B shows a perspective view of a fourth embodiment of the flooring tape.

Similar reference numerals may have been used in different figures to denote similar components.

DESCRIPTION OF EXAMPLE EMBODIMENTS

A flooring tape for securing a first flooring unit adjacent to a second flooring unit is described. In one embodiment, the flooring tape has two sides, a first side that is an adhesive side and a second side that is a non-adhesive side. The adhesive side has at least three portions, a first portion, a second portion and a third portion. The third portion is positioned between the first and second portions. The first portion and the second portion have a flooring adhesive layer applied thereto for forming a bond with the first and second flooring units. The third portion has a water and/or chemical resistant adhesive layer applied thereto.

In another aspect, methods of manufacturing the flooring tape are also described. The flooring tape may be manufactured by applying to an adhesive side of the flooring tape, a flooring adhesive to a first portion and a second portion. A water and/or chemical (such as, for example and without limitation, surfactant) resistant adhesive is applied to a third portion of the tape (or carrier), with the third portion being positioned between the first and the second portion on the adhesive side of the tape.

In one embodiment, the manufacturing the flooring tape includes bonding a second side of a second film to a side of a first film. The first side of the second film has a water resistant adhesive layer applied thereto, and the side of the first film has a flooring adhesive layer applied thereto. The second film may be positioned along the center of the width of first film.

In another aspect, a flooring system is described. The flooring has a first flooring unit bonded with a first portion and a third portion of a tape, a second flooring unit positioned adjacent to the first flooring unit and bonded with a second portion and the third portion of a tape. The first and second portions have applied thereto a first adhesive and the third portion has applied thereto a second adhesive.

In another aspect, a method of applying a flooring material having a first flooring unit and a second flooring unit is described. The flooring material may be applied by placing a first side of a tape having a first portion, a second portion and a third portion, the third portion positioned between the first and second portions, wherein the first portion and the second portion have a flooring adhesive layer applied thereto for forming a bond with the first and second flooring units, and the third portion having a water resistant adhesive layer applied thereto; and positioning the first flooring unit on the first portion and the second flooring unit on the second portion.

Figure 1:
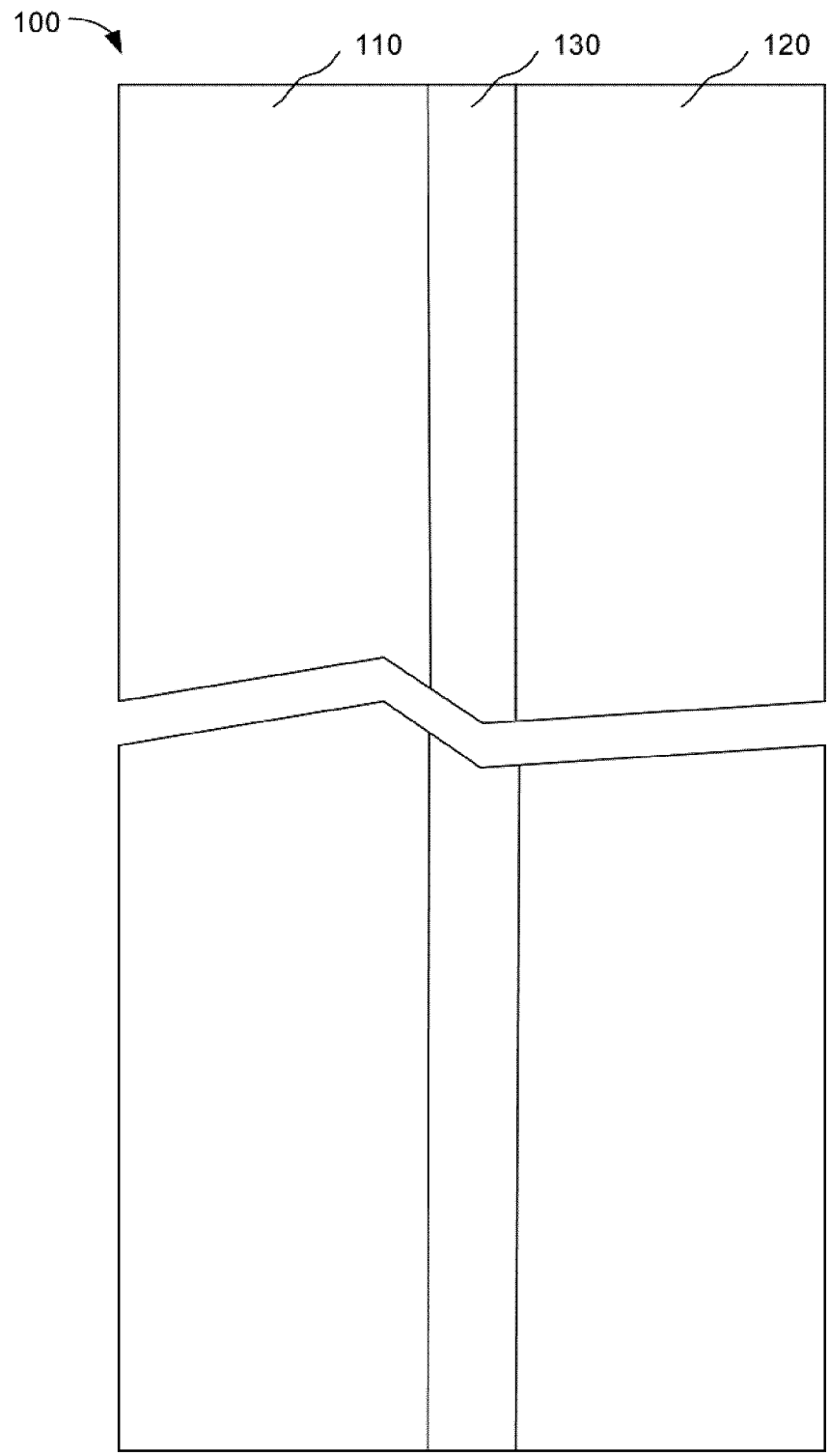
FIG. 1 shows a top view of the floor tape.
Figure 4A:
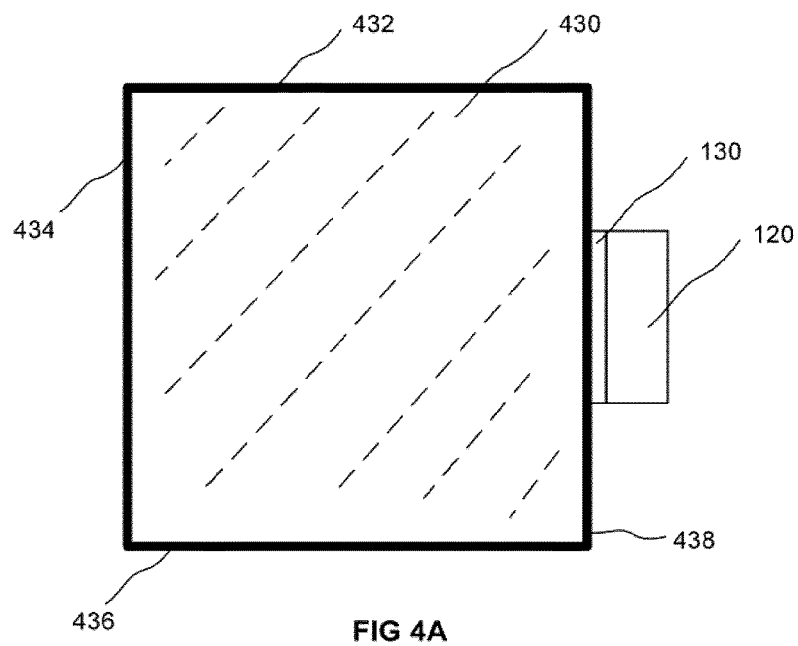
FIG. 4A shows a top plan view of the tape positioned underneath a flooring unit.
Figure 4B:
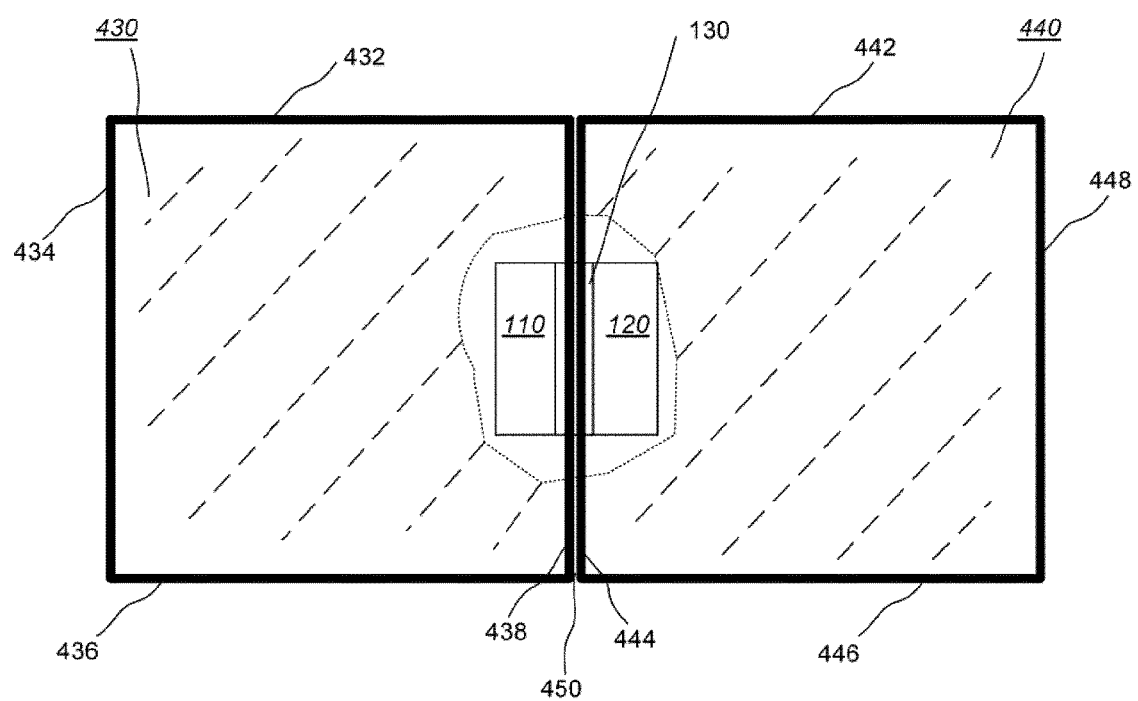
FIG. 4B shows a top plan view of the tap positioned underneath two adjacent flooring units, with a cut-out in the flooring units to illustrate the position of the tape.

With reference to FIGS. 1, 4A and 4B, a flooring tape 100 is described. The flooring adhesive layer applied to the first and second portions 110, 120 is suited for forming a bond with a flooring unit, such as flooring units 430, 440. The flooring adhesive layer is better suited at securing the flooring units 430, 440 than the water resistant adhesive layer applied to the third portion 130. However, the water resistant adhesive layer is better suited than the flooring adhesive layer at resisting water, detergent from cleaning, dust, debris and other particles that may seep in through a gap 450 formed between the two flooring units 430, 440. Thus, the third portion 130 is better suited to be positioned along the gap 450. The third portion 130 will therefore be subjected to the materials seeping in through the gap 450, while the first and second portions 110, 120 will benefit from an added distance from the gap 450. The added distance helps keep the materials seeping in through the gap 450 away from the flooring adhesive layer; thus protecting the flooring adhesive layer from the materials and thereby helps to reduce the amount of material that may bond with the flooring adhesive layer. If the flooring adhesive layer bonds with the materials, then the bonds formed with the flooring units 430, 440 may deteriorate and become ineffective; thereby causing the flooring units 430, 440 to separate from one another.

The width of the flooring tape is not particularly limited and can depend upon the particular product requirements. In one embodiment, the first and second portions 110, 120 are of the same width and are approximately 2.5 to 3.5 times wider than the third portion 130. In a particular embodiment, each of the first and second portions 110, 120 is 1.5 inches wide and the third portion is 0.5 inches wide. Therefore, in total, the width of the flooring tape 100 is about 3.5 inches.

Figure 2A:
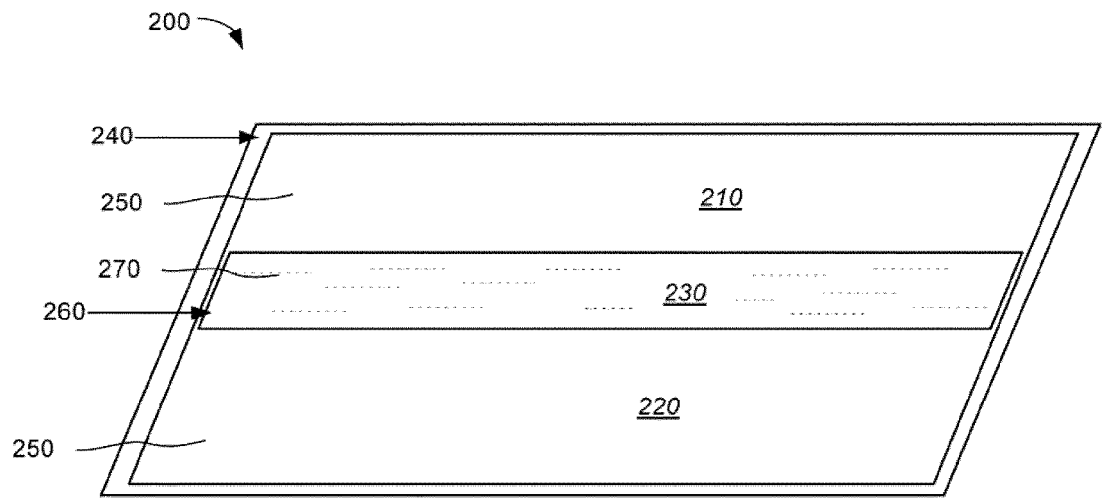
FIG. 2A shows a perspective view of an embodiment of the flooring tape.
Figure 2B:
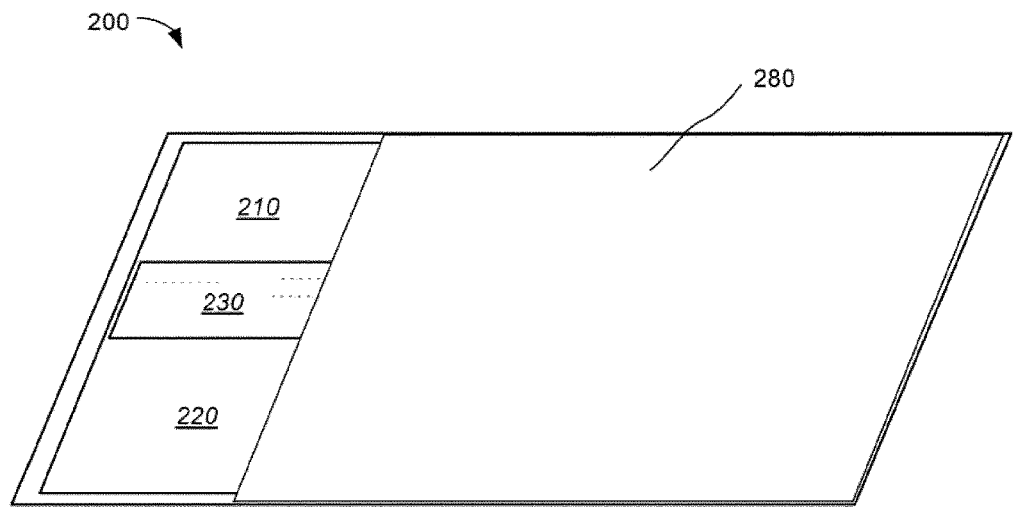
FIG. 2B shows a perspective view of an embodiment of the flooring tape with a releasable liner.

Another embodiment 200 of the flooring tape 100 is shown in FIGS. 2A and 2B. In a particular embodiment, the flooring tape 200 is made of using two polyester or polyethylene film tapes 240, 260. The first film 240 is wider than the second film 260, approximately 6 to 8 times wider in some embodiments. In one embodiment, the first film 240 is 3.5 inches wide, while the second film 260 is 0.5 inches wide.

One side of the first polyester or polyethylene film tape 240 is coated with an adhesive 250, such that the flooring tape 200 has a first side that is an adhesive side and a second that is a non-adhesive side. The non-adhesive side allows for ease of handling of the tape and when in use is positioned facing the floor, to ensure that no adhesive touches the floor. The adhesive side has first, second and third portions 210, 220 and 230 respectively. The portions are characterized by their respective adhesive properties as previously explained and are defined by the first and second tapes 240, 260.

The entire width of the first polyester or polyethylene film tape 240 can be coated with a flooring adhesive layer 250. However, some portions of the first polyester or polyethylene film tape may not be coated with the flooring adhesive layer, for example, portions near the edge of the tape, to prevent the flooring adhesive layer from dripping. The flooring adhesive layer 250 will provide high-strength adhesion and may be an acrylic-based adhesive. In some embodiments, a tape having a pre-applied acrylic-based adhesive can be used as the first polyester film tape 240 in to making the flooring tape 200. Such a tape can be purchased from World of Tape Ltd™, having product number MYP-34US. The tape MYP-34US has an adhesive having an adhesive parameter of 23 lb/in.

The second polyester or polyethylene film tape 260 is then bonded with the flooring adhesive layer 250 of the first polyester film tape 240. The second film 260 is positioned in the center of the first polyester film 240, thereby forming the third portion 230. The water resistant adhesive layer 270 is then applied to the entire width of the second film 260. However, some portions of the first polyester film tape may not be coated with the flooring adhesive layer, for example, portions near the edge of the tape, to prevent the flooring adhesive layer from dripping. In some embodiments, a tape having a pre-applied silicone powder coating suitable to resist water and chemicals can be used as the second polyester film tape 260 in to making the flooring tape 200. Such a tape can be purchased from World of Tape Ltd™, having product number MYP-3RS. The tape MYP-3RS has an adhesive having an adhesive parameter of 30 oz/in. Thus the water resistant adhesive layer 270 has a much weaker adhesive strength than the flooring adhesive layer 250, but is better able to resist liquids and chemicals.

The thickness of the flooring adhesive layer 250, applied on the first film tape 240 used for forming the flooring tape 200 is not particularly limited and can depend upon the particular product requirements. In general, the thickness of the flooring adhesive layer 250 is selected to avoid significantly increasing the overall thickness of the flooring tape 200. In one embodiment, for example and without limitation, the thickness of the adhesive is from about 1 mil to about 5 mil or more. In a further embodiment, for example and without limitation, the thickness of the adhesive is about 1.4 mil or in another embodiment about 3.5 mil.

The thickness of the water resistant adhesive layer 240, applied on the second film tape 250 used for forming the flooring tape 200 is also not particularly limited and can depend upon the particular product requirements. In general, the thickness of the water resistant adhesive layer 240 is selected to avoid significantly increasing the overall thickness of the flooring tape 200. In one embodiment, for example and without limitation, the thickness of the adhesive is from about 1 mil to about 5 mil or more. In a further embodiment, for example and without limitation, the thickness of the adhesive is about 2 mil.

The thickness of the first and second polyester film tapes 240, 260 used for forming the thermally flooring tape 200 is not particularly limited. In general, however, it is selected to avoid significantly contributing to the overall thickness of the composite tape while maintaining its desired function. In one embodiment, for example and without limitation, each of the first and second polyester film tapes 240, 260 has a thickness from about 0.5 to about 4 mil. In a particular embodiment, for example and without limitation, the first polyester film tape 240 has a thickness of about 2 mil and the second polyester film tape 260 had a thickness of about 2 mil. In a further embodiment, for example and without limitation, the tape or carrier has a thickness of about 1 mil with a tensile strength of 0.158 MPA (23 psi).

The flooring tape 200 may also have a removable liner 280 applied to it, as shown in FIG. 2B. The removable liner protects the adhesive until the tape 200 is ready for use, thus allowing for convenient storage and shipping of the flooring tape 200.

Figure 3A:
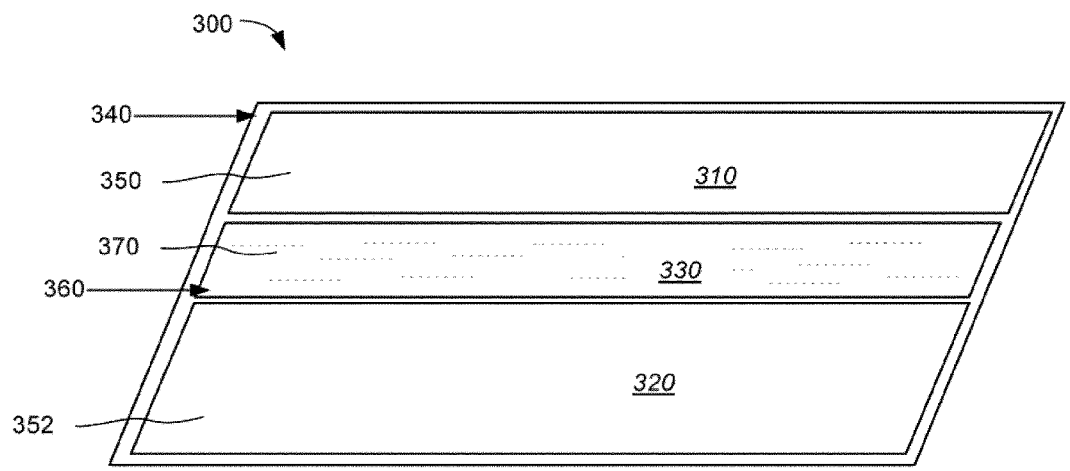
FIG. 3A shows a perspective view of a second embodiment of the flooring tape.
Figure 3B:
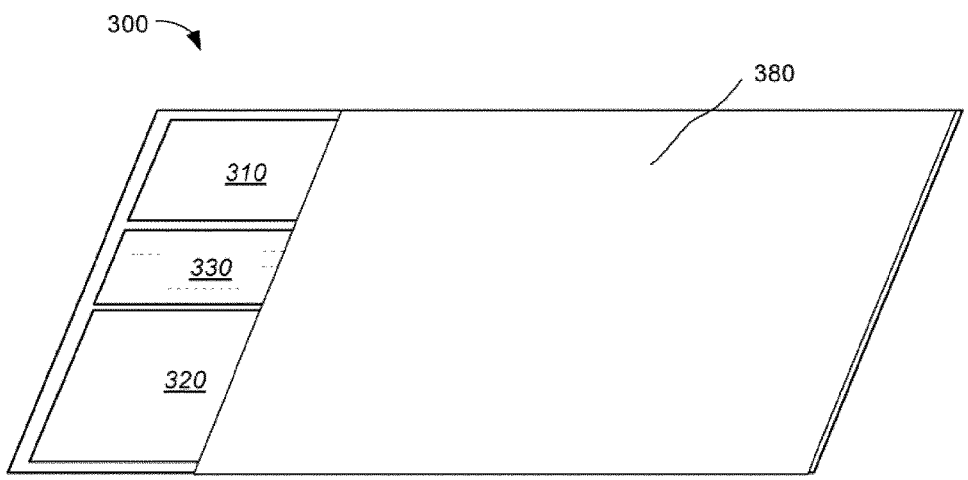
FIG. 3B shows a perspective view of a second embodiment of the flooring tape with a releasable liner.

Another embodiment 300 of the flooring tape 100 is shown in FIGS. 3A and 3B. In a particular embodiment, the flooring tape 300 is also made using two polyester film tapes 340, 360. The first film 340 is wider than the second film

360, approximately 6 to 8 times wider in some embodiments. In one embodiment, the first film 340 is 3.5 inches wide, while the second film 360 is 0.5 inches wide.

One side of the first polyester film tape 340 is coated with adhesives 350, 352 and 370 as will be explained, such that the flooring tape 300 has an first adhesive side and a second non-adhesive side. The non-adhesive side allows for ease of handling of the tape and when in use is positioned facing the floor, to ensure that no adhesive contacts the floor. The adhesive side has first, second and third portions 310, 320 and 330 respectively. The portions are characterized by their respective adhesive properties as previously explained and are described by the first and second tapes 340, 360.

Two portions positioned on either side of the first polyester film tape are coated with flooring adhesive layers 350, 352, which may be an acrylic-based adhesive. A gap portion in the center of the first polyester film 340, having a width equal to the width of the second polyester film tape 360 is not covered with a flooring adhesive layer.

The gap portion of the first polyester film 340 is instead covered with a light duty adhesive layer, sufficient to form a bond with a non-adhesive side of the second polyester film tape 360. The second polyester film tape 360 is then bonded with the light duty adhesive layer of the first polyester film tape 340. The second film 360 is positioned in the center of the first polyester film 340, thereby forming the third portion 330. The water resistant adhesive layer 370 is then applied to the entire width of the second film 360.

The flooring tape 300 may also have a removable liner 380 applied to it, as shown in FIG. 3B. The removable liner protects the adhesive until it the tape 300 is ready for use, thus allowing for convenient storage and shipping of the flooring tape 300. In one embodiment, for example and without limitation, the removable liner is a fluorosilicone liner. In another embodiment, for example and without limitation, the removable liner is paper liner with fluorosilicone in the centre to align with the water resistant adhesive along the length of the third portion. In such an embodiment, the width of the fluorosilicone is set to be at least equal to or more than the width of third portion.

The thickness of the flooring adhesive layer 350, applied on the first polyester film tape 340 used for forming the flooring tape 300 is not particularly limited and can depend upon the particular product requirements. In general, the thickness of the flooring adhesive layer 350 is selected to avoid significantly increasing the overall thickness of the flooring tape 300. In one embodiment, for example and without limitation, the thickness of the adhesive is from about 1 mil to about 4 mil. In a further embodiment, for example and without limitation, the thickness of the adhesive is about 1.4 mil.

The thickness of the water resistant adhesive layer 340, applied on the second polyester film tape 350 used for forming the flooring tape 300 is also not particularly limited and can depend upon the particular product requirements. In general, the thickness of the water resistant adhesive layer 340 is selected to avoid significantly increasing the overall thickness of the flooring tape 300. In one embodiment, for example and without limitation, the thickness of the adhesive is from about 1 mil to about 4 mil. In a further embodiment, for example and without limitation, the thickness of the adhesive is about 2 mil.

The thickness of the first and second polyester film tapes 340, 360 used for forming the thermally flooring tape 300 is not particularly limited. In general, however, it is selected to avoid significantly contributing to the overall thickness of the composite tape while maintaining its desired. In one embodiment, for example and without limitation, each of the first and second polyester film tapes 340, 360 has a thickness from about 0.5 to about 4 mil. In a particular embodiment, for example and without limitation, the first polyester film tape 340 has a thickness of about 2 mil and the second polyester film tape 360 had a thickness of about 2 mil.

As would be recognized by a person of skill in the art, based on the disclosure herein, it is not absolutely necessary to laminate two tapes together to form the flooring tape disclosed herein. Rather, a single layered flooring tape can be formed by applying the different adhesives on portions of a single tape layer to form the flooring tape.

With reference to FIGS. 4A and 4B, a flooring system having a first flooring unit 430 secured adjacent to a second flooring unit 440 using flooring tape 100 is explained. Any embodiment of the flooring tape 100 can be used, for example and without limitation flooring tapes 200, 300. FIG. 4A shows a top plan view of only the first flooring unit 430 placed above the flooring tape 100 and FIG. 4B shows a top plan view of the first flooring unit 430 secured adjacent to the second flooring unit 440. In FIG. 4B a portion of the flooring units 430, 440 is cut-out to better illustrate the position of the tape with respect to the flooring units. The flooring units 430, 440 may be tiles of vinyl flooring material. In other embodiments, the flooring units 430, 440 may be portions of carpet or other types of flooring material.

The flooring is made up of several flooring units, including flooring units 430, 440, secured adjacent to one another using the flooring tape 100. The bottom of the first flooring unit 430 is bonded with the adhesive side of the flooring tape 100 and more particularly the first portion 110 and the third portion 130 of the floor tape 100. The non-adhesive side of the flooring tape 100 therefore faces the floor. The first flooring unit 430 is positioned such that a seam 438 of the first flooring unit 430 is along the third portion 130. Additionally, part of the third portion is left exposed, as shown in FIG. 4A. The exposed part allows for positioning of a seam 444 of the second flooring unit 440 along the third portion 130 of the same flooring tape 100, as shown in FIG. 4B. A small gap 450 is typically left behind in between the seams 438, 444. The gap 450 is also positioned along the third portion 130. The bottom of the second flooring unit 430 is then bonded with the adhesive side of the flooring tape 100 and more particularly the second portion 120 and the third portion 130 of the floor tape 100.

While FIGS. 4A and 4B demonstrate the flooring tape 100 being used at only one seam 438, 444 of each of the flooring units 430, 440, the flooring tape 100 can be used at every seam of the flooring units, for example to secure multiple flooring units together. An additional flooring tape 100 can be used along each of the seams 432, 434, 436, 442, 448 and 446 to secure additional flooring units adjacent to the flooring units 430, 440; thereby a large flooring area can be covered with the flooring units.

Figure 5A:
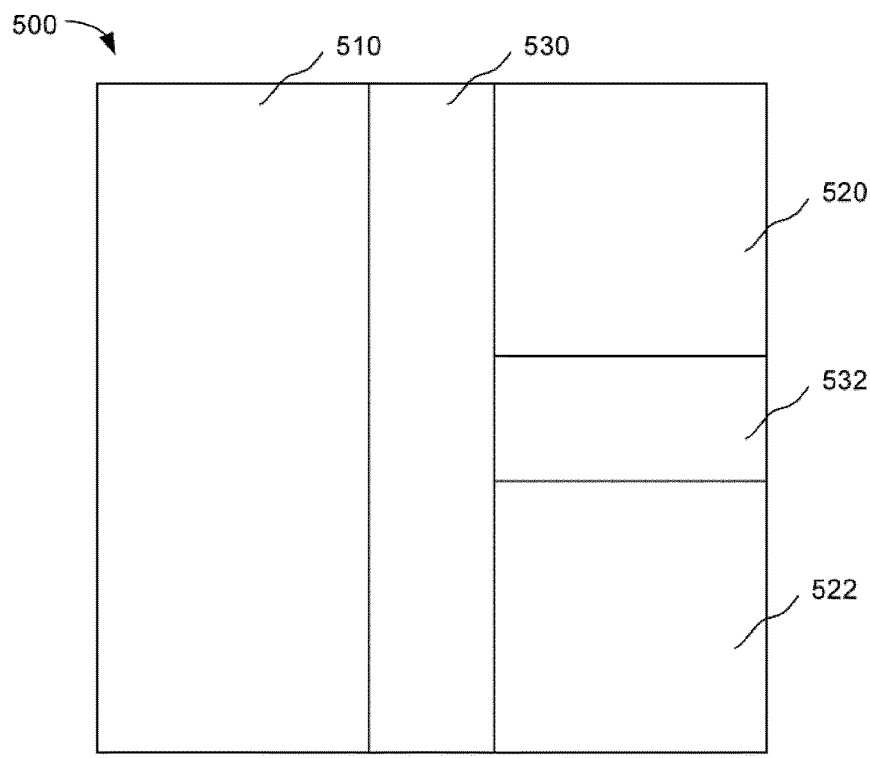
FIG. 5 A shows a perspective view of a third embodiment of the flooring tape.
Figure 5B:
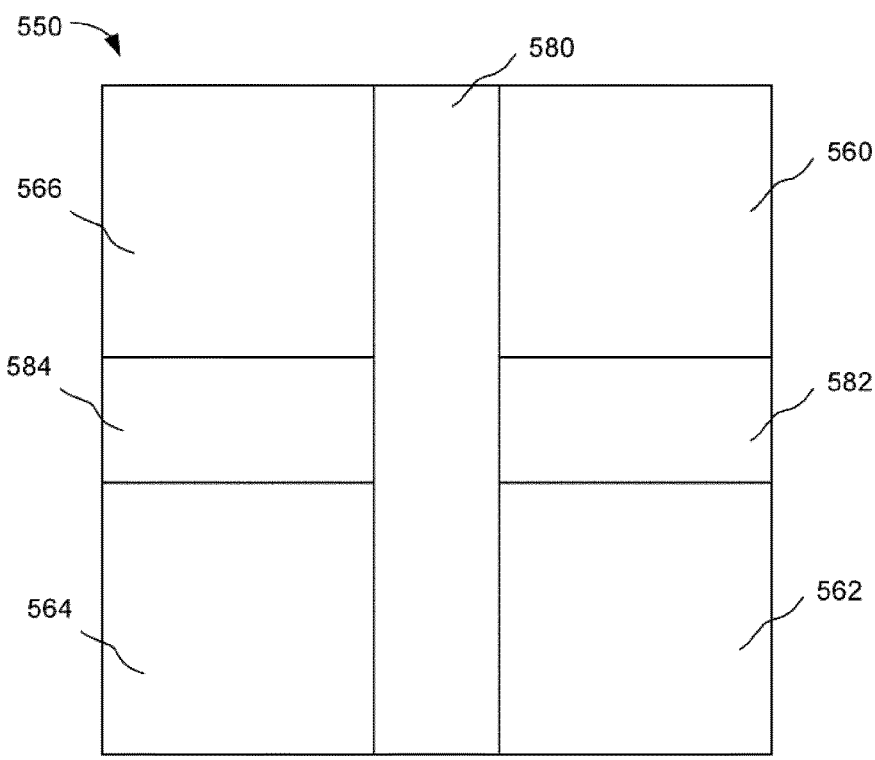

With reference to FIGS. 5A and 5B, flooring tapes 500 and 550 are explained. Each of the flooring tapes 500 and 550 has different adhesives in different portions of the flooring tape to bond flooring units to one another. Any embodiment of the flooring tape 100 can be used to construct the flooring tapes 500 and 550, for example and without limitation flooring tapes 200, 300. The flooring tapes 500 and 550 are adapted for boding differently sized flooring units, however, may also be used to bond flooring units of the same size as previously explained with reference to FIGS. 4A and 4B.

Each of the flooring tapes 500 and 550 is substantially rectangular in shape and may in some embodiments be square-shaped, as shown in FIGS. 5A and 5B respectively.

The flooring tape 500, shown in FIG. 5A, has the flooring adhesive layer applied to the portions 510, 520 and 522 and the water resistant adhesive layer applied to portions 530 and 532. The water resistant adhesive layer 530 is positioned along the center of the length of the substantially rectangular tape 500 and the water resistant adhesive layer 532 is positioned along the center of the width of the substantially rectangular tape 500. The water resistant adhesive layer 530 extends substantially from one end of the tape 500 to an opposing end, along the length of the tape. In contrast, the water resistant adhesive layer 532 extends substantially from one end of the tape 500 to the center of the tape, along the width of the tape. In other embodiments, adhesive layer 530 extends along the width of the tape while the adhesive layer 532 extends along the length of the tape. The two water resistant adhesive layers 530 and 532 thereby form a "T-shaped" pattern as shown in FIG. 5A; the two water resistant adhesive layers 530 and 532 being perpendicular to one-another.

Figure 6A:
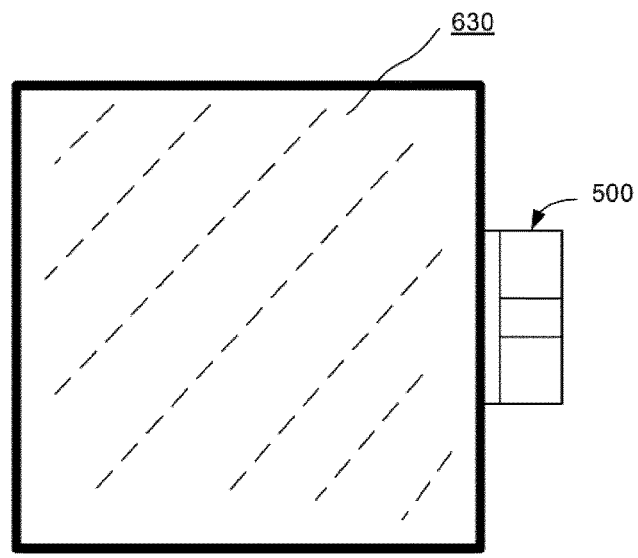
FIG. 6A shows a top plan view of a third embodiment of the tape positioned underneath a flooring unit.
Figure 6B:
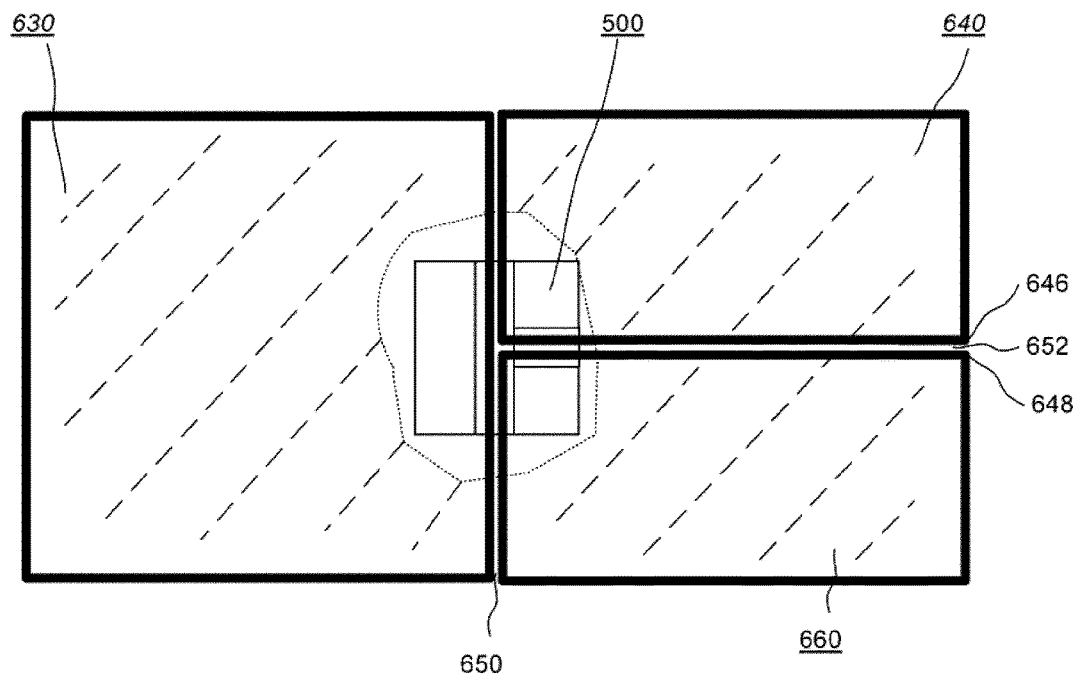
FIG. 6B shows a top plan view of a third embodiment of the tape positioned underneath a plurality of flooring units.

With reference to FIGS. 6A and 6B, a flooring system having a first flooring unit 630 secured adjacent to a second flooring unit 640 and a third flooring unit 660 using flooring tape 500 is explained. Any embodiment of the flooring tape 500 can be used, for example and without limitation a flooring tape 500 constructed similarly to flooring tapes 200, 300.

FIG. 6A shows a top plan view of only the first flooring unit 630 placed above the flooring tape 500 and FIG. 6B shows a top plan view of the first flooring unit 630 secured adjacent to both the second and third flooring units 640, 660. In FIG. 6B a portion of the flooring units 630, 640, 660 is cut-out to better illustrate the position of the tape 500 with respect to the flooring units. The flooring units 630, 640, 660 may be tiles of vinyl flooring material. In other embodiments, the flooring units 630, 640, 660 may be portions of carpet or other types of flooring material. The flooring units 630, 640, 660 may be of the same size, or alternately of different sizes.

The flooring is made up of several flooring units, including flooring units 630, 640, 660 secured adjacent to one another using the flooring tape 500. The bottom of the first flooring unit 630 is bonded with the adhesive side of the flooring tape 500 and more particularly the portion 510 and the portion 530 of the floor tape 500. The non-adhesive side of the flooring tape 500 therefore faces the floor. The first flooring unit 630 is positioned such that a seam of the first flooring unit 630 is along the tape portion 530. Additionally, part of the tape portion 530 is left exposed, as shown in FIG. 6A.

A seam of the second flooring unit 640 is placed along the exposed part of the tape portion 530, as shown in FIG. 6B. The bottom of second flooring unit 640 is thus bonded with the exposed part of the tape portion 530, the tape portion 520 and the tape portion 532. Part of each of the tape portions 530 and 532 is left exposed, as shown in FIG. 6B. A small gap 650 is typically left behind in between the seams of the flooring units 630 and 640. The gap 650 is aligned with the tape portion 530.

A seam of the third flooring unit 660 is placed along the exposed part of the tape portion 530, as shown in FIG. 6B. The bottom of third flooring unit 660 is thus bonded with the exposed part of the tape portion 530, the tape portion 522 and the exposed part of the tape portion 532. A small gap 650 is typically left behind in between the seams of the flooring units 630 and 640. The gap 650 is aligned with the tape portion 530. Another small gap 652 is typically left behind in between the seams of the flooring units 640 and 660. The gap 652 is aligned with the tape portion 532.

Accordingly, with one flooring tape 500 three flooring units can be secured adjacent one-another. The gaps in between the three flooring units are aligned with the water and/or chemical resistant portions of the flooring tape 500 (i.e. tape portions 530 and 532). The use of the flooring tape 500 may thus add more efficiency in applying a flooring material; as one flooring tape 500 is used to bond three flooring units. However, the flooring tape 500 may also be used to secure only two flooring units adjacent to one-another.

While FIGS. 6A and 6B demonstrate the flooring tape 500 being used at only one seam of each of the flooring units 630, 640, 660, the flooring tape 500 can be used at every seam of the flooring units, for example to secure multiple flooring units together. An additional flooring tape 500 can be used along each of the seams to secure additional flooring units adjacent to the flooring units 630, 640, 660; thereby a large flooring area can be covered with the flooring units.

The flooring tape 550, shown in FIG. 5B, has the flooring adhesive layer applied to the portions 560, 562, 564 and 566 and the water resistant adhesive layer applied to portions 580, 582 and 584. The water resistant adhesive layer 580 is positioned along the center of the length of the substantially rectangular tape 550 and the water resistant adhesive layer 582 is positioned along the center of the width of the substantially rectangular tape 550. The water resistant adhesive layer 580 extends substantially from one end of the tape 500 to an opposing end, along the length of the tape. The water resistant adhesive layer of portions 582 and 584 extends substantially from one end of the tape 500 to an opposing end, along the width of the tape. The two water resistant adhesive layers of portions 580, 580 and 583 thereby form a "cross" pattern as shown in FIG. 5B; the water resistant adhesive layer of portion 580 being perpendicular to the water resistant adhesive layer of portions 582 and 584.

Figure 7A:
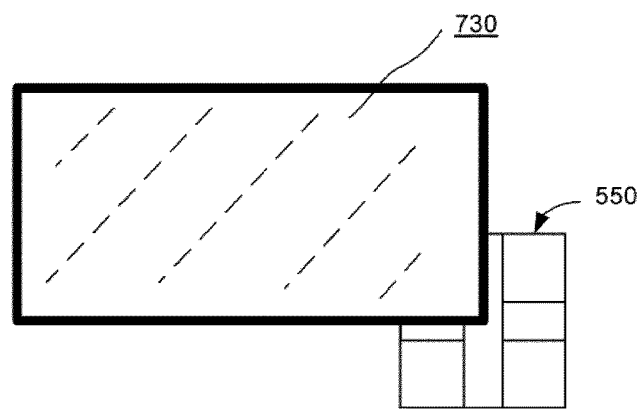
FIG. 7A shows a top plan view of a fourth embodiment of the tape positioned underneath a flooring unit.
Figure 7B:
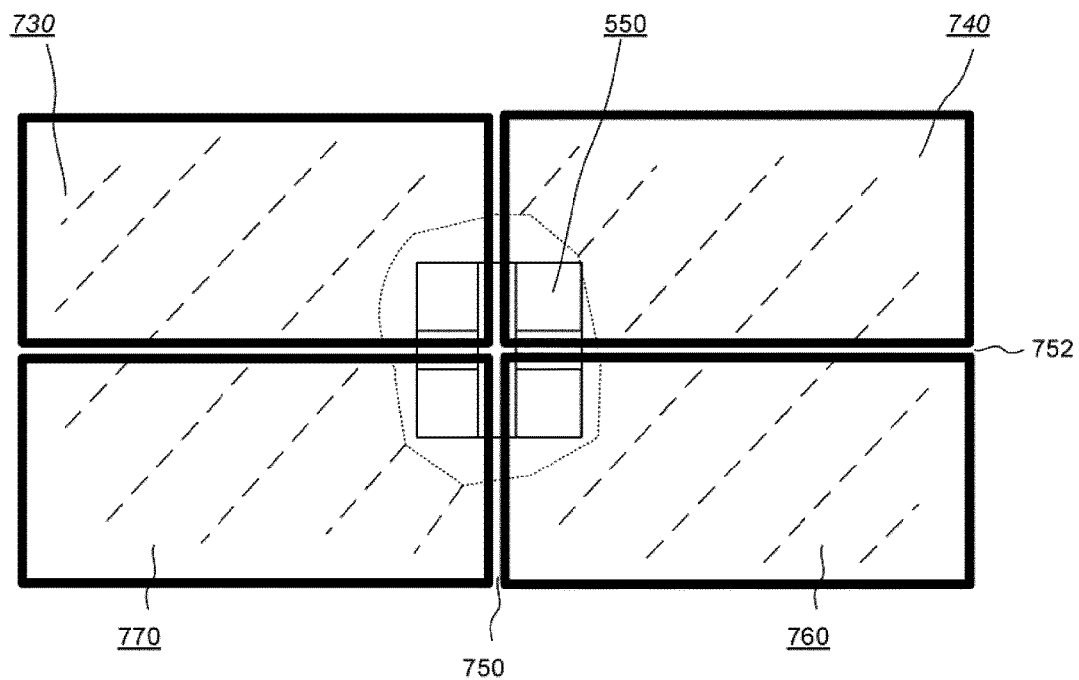
FIG. 7B shows a top plan view of a fourth embodiment of the tape positioned underneath a plurality of flooring units.

With reference to FIGS. 7A and 7B, a flooring system having a first flooring unit 730 secured adjacent to a second flooring unit 740, a third flooring unit 760 and a fourth flooring unit 770 using flooring tape 550 is explained. Any embodiment of the flooring tape 550 can be used, for example and without limitation a flooring tape 550 constructed similarly to flooring tapes 200, 300.

FIG. 7A shows a top plan view of only the first flooring unit 730 placed above the flooring tape 550 and FIG. 7B shows a top plan view of the first flooring unit 730 secured adjacent to each of the second, third and fourth flooring units 640, 660, 770. In FIG. 7B a portion of the flooring units 730, 740, 760, 770 is cut-out to better illustrate the position of the tape 550 with respect to the flooring units. The flooring units 730, 740, 760, 770 may be tiles of vinyl flooring material. In other embodiments, the flooring units 730, 740, 760, 770 may be portions of carpet or other types of flooring material. The flooring units 730, 740, 760, 770 may be of the same size, or alternately of different sizes.

The flooring is made up of several flooring units, including flooring units 730, 740, 760, 770 secured adjacent to one another using the flooring tape 550. The bottom of the first flooring unit 730 is bonded with the adhesive side of the flooring tape 550 and more particularly the tape portions 566, 584, and 580 (as shown in FIG. 5B). The non-adhesive side of the flooring tape 550 therefore faces the floor. The first flooring unit 730 is positioned such that a seam of the first flooring unit 730 is along the tape portion 580 and a second seam of the flooring unit 730 is along the tape portion 584. Additionally, part of each of the tape portions 580 and 584 is left exposed, as shown in FIG. 7A.

A seam of the second flooring unit 740 is placed along the exposed part of the tape portion 580 and along of the tape portion 582, as shown in FIG. 6B. The bottom of second flooring unit 640 is thus bonded with the exposed part of the tape portion 580, the tape portion 560 and a port of the tape portion 582. Part of each of the tape portions 580 and 582 is left exposed, as shown in FIG. 7B. A small gap 750 is typically left behind in between the seams of the flooring units 730 and 740. The gap 750 is aligned with the tape portion 580.

A seam of the third flooring unit 760 is placed along the exposed part of the tape portion 582, as shown in FIG. 7B. The bottom of third flooring unit 760 is thus bonded with the exposed part of the tape portion 582, the tape portion 562 and a part of the tape portion 580. Another small gap 752 is typically left in between the seams of the flooring units 740 and 760. The gap 752 is aligned with the tape portion 582.

A seam of the fourth flooring unit 770 is placed along the exposed part of the tape portions 582 and 580, as shown in FIG. 7B. The bottom of fourth flooring unit 770 is thus bonded with the exposed part of the tape portions 584, 580 and the tape portion 564. A small gap 750 is typically left in between the seams of the flooring units 770 and 760. The gap 750 is aligned with the tape portion 582. Another small gap 752 is typically left in between the seams of the flooring units 770 and 730. The gap 752 is aligned with the tape portion 584.

Accordingly, with one flooring tape 550 four flooring units can be secured adjacent one-another. The gaps in between the four flooring units are aligned with the water and/or chemical resistant portions of the flooring tape 550 (i.e. tape portions 580, 582 and 584). The use of the flooring tape 550 may thus add more efficiency in applying a flooring material; as one flooring tape 550 can be used to bond four flooring units. However, the flooring tape 500 may also be used to secure only three or only two flooring units adjacent to one-another.

While FIGS. 7A and 7B demonstrate the flooring tape 550 being used at only one seam of each of the flooring units 730, 740, 760, 770, the flooring tape 550 can be used at every seam of the flooring units, for example to secure multiple flooring units together. An additional flooring tape 550 can be used along each of the seams to secure additional flooring units adjacent to the flooring units 730, 740, 760, 770; thereby a large flooring area can be covered with the flooring units.

By positioning different adhesives in different portions of the flooring tape, the flooring units can remain bonded to the flooring tape and also help resist any moisture or other chemicals, such as surfactants or other reagents used in cleaning etc., from contacting the bond between the flooring unit and flooring adhesive present on the tape. This can help to prevent any warping around the edges of the flooring unit and retain the flooring unit in place.

In another embodiment, for example and without limitation, the second (non-adhesive) side of the flooring tape can be provided with features that can help to prevent slippage of the flooring tape when placed on a floor. In a particular embodiment, for example and without limitation, the anti slip property can be obtained by a 1/64" foam, or an anti slip print on the back for slippery surfaces, which can include, for example and without limitation, a neoprene rubber, a polyethylene foam, a paper or a flock (similar to felt).

Certain adaptations and modifications of the described embodiments can be made. Therefore, the above discussed embodiments are considered to be illustrative and not restrictive.

What is claimed is:

1. A tape for securing a first flooring unit adjacent to a second flooring unit comprising:
    a first portion, a second portion and a third portion positioned between the first and second portions,
    wherein the first portion and the second portion have a flooring adhesive layer applied thereto for forming a bond with the first and second flooring units, and
    the third portion having a water and/or chemical resistant adhesive layer applied thereto;
    wherein the water resistant adhesive layer is a silicone powder coating.

2. The tape of claim 1, wherein the third portion comprises a second film bonded to a side of the tape having the first, second and third portions.

3. The tape of claim 1, wherein each of the first and second portions is wider than the third portion.

4. The tape of claim 3, wherein each of the first and second portions is 2.5 to 3.5 times wider than the third portion.

5. The tape of claim 1, wherein the first portion is suited for forming a bond with the first flooring unit and the second portion is suited for forming a bond with the second flooring unit.

6. The tape of claim 5, wherein when
    the flooring adhesive layer applied to the first portion forms a bond with the first flooring unit and the flooring adhesive layer applied to the second portion forms a bond with the second flooring unit,
    the third portion is positioned adjacent a gap formed between the first flooring unit and the second flooring unit.

7. The tape of claim 1, wherein the water resistant adhesive layer is configured to form weaker bonds with the flooring than the flooring adhesive layer.

8. The tape of claim 7, wherein the flooring adhesive layer is an acrylic-based adhesive.

9. The tape of claim 7, wherein the water resistant adhesive layer is detergent resistant.

10. The tape of claim 1, further comprising an additional water and/or chemical resistant adhesive layer positioned perpendicularly to the third portion.

* * * * *